United States Patent
Larsen

(10) Patent No.: US 12,456,803 B2
(45) Date of Patent: Oct. 28, 2025

(54) ROTATIONAL WIRELESS COMMUNICATION SYSTEM

(71) Applicant: Skydio, Inc., San Mateo, CA (US)

(72) Inventor: Niels Bonne Larsen, Sunnyvale, CA (US)

(73) Assignee: Skydio, Inc., San Mateo, CA (US)

( * ) Notice: Subject to any disclaimer, the term of this patent is extended or adjusted under 35 U.S.C. 154(b) by 0 days.

(21) Appl. No.: 18/393,892

(22) Filed: Dec. 22, 2023

(65) Prior Publication Data

US 2024/0235018 A1 Jul. 11, 2024

Related U.S. Application Data

(63) Continuation of application No. 17/892,946, filed on Aug. 22, 2022, now Pat. No. 11,881,629, which is a continuation of application No. 16/803,002, filed on Feb. 27, 2020, now Pat. No. 11,437,718, which is a continuation of application No. 15/381,951, filed on Dec. 16, 2016, now Pat. No. 10,581,160.

(51) Int. Cl.
| | | |
|---|---|---|
| *H01Q 3/00* | (2006.01) | |
| *G01S 19/53* | (2010.01) | |
| *H01Q 3/24* | (2006.01) | |
| *H01Q 9/04* | (2006.01) | |
| *H01Q 1/22* | (2006.01) | |
| *H04W 4/02* | (2018.01) | |

(52) U.S. Cl.
CPC ............ *H01Q 3/247* (2013.01); *G01S 19/53* (2013.01); *H01Q 3/00* (2013.01); *H01Q 9/0435* (2013.01); *H01Q 1/22* (2013.01); *H04W 4/026* (2013.01)

(58) Field of Classification Search
CPC ........ H01Q 3/247; H01Q 3/00; H01Q 9/0435; H01Q 1/22; G01S 19/53; H04W 4/026
USPC .............................................. 342/357.36, 359
See application file for complete search history.

(56) References Cited

U.S. PATENT DOCUMENTS

| | | | |
|---|---|---|---|
| 4,303,394 A | 12/1981 | Berke | |
| 6,590,536 B1 | 7/2003 | Walton | |
| 7,423,666 B2 | 9/2008 | Sakakibara | |
| 7,532,224 B2 | 5/2009 | Bannai | |
| 7,773,035 B2 | 8/2010 | Murata | |
| 7,869,783 B2 | 1/2011 | Morton | |
| 8,868,144 B2 | 10/2014 | Shi | |
| 9,019,431 B2 * | 4/2015 | Phillips | G03B 17/566 |
| | | | 348/375 |
| 9,100,100 B2 | 8/2015 | Shi | |

(Continued)

FOREIGN PATENT DOCUMENTS

WO WO-2017091735 A1 * 6/2017 ........... G06F 3/0482

*Primary Examiner* — Chuong P Nguyen
(74) *Attorney, Agent, or Firm* — Young Basile Hanlon & MacFarlane, P.C.

(57) ABSTRACT

An apparatus comprising a body and a wireless communication system. The body partially encloses a camera. The wireless communication system is integrated within or coupled to the body of the apparatus. The wireless communication system has a sensor and an antenna. The sensor is configured to determine an orientation of the wireless communication system. The antenna is configured to transmit or receive wireless signals. The antenna has a ground plane and a substrate connected to and extending from the ground plane. The substrate has one or more chamfers formed within a wall of the substrate and feeds disposed on the substrate.

20 Claims, 15 Drawing Sheets

(56) References Cited

U.S. PATENT DOCUMENTS

| | | | |
|---|---|---|---|
| 9,112,277 B2 | 8/2015 | Bauder | |
| 9,562,764 B2 | 2/2017 | France | |
| 9,639,935 B1 * | 5/2017 | Douady-Pleven | H04N 19/10 |
| 9,853,684 B2 | 12/2017 | Boire | |
| 10,361,490 B1 | 7/2019 | Lee | |
| 10,483,622 B2 | 11/2019 | Lee | |
| 10,554,885 B2 * | 2/2020 | Stewart | H04N 23/667 |
| 10,581,160 B2 | 3/2020 | Larsen | |
| 10,643,406 B2 * | 5/2020 | Arya | H04W 4/38 |
| 10,686,246 B2 * | 6/2020 | Park | H01Q 1/526 |
| 10,725,142 B2 | 7/2020 | Feineman | |
| 10,811,769 B2 | 10/2020 | Ting | |
| 11,310,399 B2 * | 4/2022 | Phillips | H04N 7/183 |
| 11,437,718 B2 | 9/2022 | Larsen | |
| 11,667,251 B2 * | 6/2023 | Phillips | F16M 11/14 |
| | | | 348/158 |
| 11,805,307 B2 * | 10/2023 | Okano | H04N 23/00 |
| 2003/0160757 A1 | 8/2003 | Shirai | |
| 2006/0210279 A1 | 9/2006 | Hillis | |
| 2008/0268926 A1 | 10/2008 | Black | |
| 2011/0050903 A1 | 3/2011 | Vorobiev | |
| 2011/0275408 A1 | 11/2011 | Kulik | |
| 2014/0159958 A1 | 6/2014 | Haziza | |
| 2016/0105212 A1 | 4/2016 | Boire | |
| 2016/0303735 A1 | 10/2016 | Nappo | |
| 2017/0309088 A1 | 10/2017 | Arya | |
| 2018/0180416 A1 | 6/2018 | Edelman | |
| 2018/0255247 A1 | 9/2018 | Ristroph | |
| 2018/0356945 A1 * | 12/2018 | Gannon | G06F 3/04883 |
| 2019/0181554 A1 | 6/2019 | Lee | |
| 2021/0199813 A1 | 7/2021 | Kaufmann | |
| 2021/0226346 A1 | 7/2021 | Kaufmann | |
| 2022/0416416 A1 | 12/2022 | Larsen | |

* cited by examiner

ROTATIONAL WIRELESS COMMUNICATION SYSTEM

CROSS REFERENCE TO RELATED APPLICATIONS

This application is a continuation of U.S. patent application Ser. No. 17/892,946, filed Aug. 22, 2022, which is a continuation of U.S. patent application Ser. No. 16/803,002, filed Feb. 27, 2020, now U.S. Pat. No. 11,437,718, which claims priority to U.S. patent application Ser. No. 15/381,951, filed Dec. 16, 2016, now U.S. Pat. No. 10,581,160, the contents of which are incorporated by reference in their entirety.

TECHNICAL FIELD

This disclosure relates to a wireless communication system, and more specifically, to the wireless communication system placed in different orientations communicating with another wireless communication system.

BACKGROUND

Wireless communication systems communicate with each other by transmitting and receiving wireless signals. A wireless communication system includes an antenna that transmits or receives wireless signals. Generally, an antenna of a wireless communication system has a different antenna gain depending on the orientation of the antenna with respect to an antenna of another wireless communication system. In particular, a wireless signal directed in a particular direction associated with a high antenna gain may be transmitted or received without much loss, whereas another wireless signal directed in a different direction with a low antenna gain may be significantly suppressed. Likewise, an antenna of a wireless communication system has a different polarization depending on the orientation of the antenna with respect to an antenna of another wireless communication system. A wireless signal directed in a particular direction associated with a matched polarization may be transmitted or received without much loss, whereas another wireless signal with different polarization would be significantly suppressed. Thus, a wireless communication system oriented in a direction with a high antenna gain and matched polarization may establish a successful wireless communication with another wireless communication system. However, a wireless communication system oriented in another direction with a low antenna gain and mismatched polarization may fail to establish a wireless communication with said another wireless communication system.

SUMMARY

The present teachings provide an apparatus including a body and a wireless communication system. The body partially encloses a camera. The wireless communication system is integrated within or coupled to the body of the apparatus. The wireless communication system includes: a sensor, an antenna, a switching unit, a wireless communication circuit, and a controller. The sensor is configured to determine an orientation of the wireless communication system. The antenna is configured to transmit or receive wireless signals and configured to have an antenna gain and polarization. The switching unit is configured to change a configuration of the antenna gain and polarization. The wireless communication circuit is electrically coupled to the antenna to transmit or receive the wireless signals. The controller is electrically coupled to the antenna, the wireless communication circuit, the switching unit, and the sensor. The sensor determines the orientation of the wireless communication system related to an external wireless communication system and the switching unit changes the configuration of the antenna gain and polarization based upon the orientation of the wireless communication system and the external wireless communication system.

The present teachings provide an apparatus including: a body and a wireless communication system. The body partially enclosing a camera. The wireless communication system is integrated within or coupled to the body of the apparatus. The wireless communication system includes: a sensor, an antenna, a switching unit, and a wireless communication circuit. The sensor is coupled to the body, and the sensor configured to generate a detection signal indicating an orientation of the wireless communication system. The antenna that transmits or receives a wireless signal and is changeable between a first configuration and a second configuration to communicate with an external communication system. The switching unit is configured to switch between the first configuration and the second configuration based upon the orientation of the wireless communication system relative to the external communication system. The wireless communication circuit electrically coupled to the antenna through the switching unit.

The present teachings provide a method including: detecting a position or orientation of a wireless communication system with a sensor of the wireless communication system that is integrated within or coupled to a body of an apparatus that partially encloses a camera. Transmitting or receiving wireless signals with an antenna of the wireless communication system, the antenna having an antenna gain and polarization. Switching the antenna gain and polarization of the antenna with a switching unit of the wireless communication system. Controlling the antenna, the switching unit, and the sensor with a controller. Determining a position of an external communication system and changing the antenna gain, the polarization, or both based on the position or the orientation of the wireless communication system relative to the external communication system.

The present teachings provide an apparatus comprising: a body and a wireless communication system. The body partially encloses a camera. The wireless communication system is integrated within or coupled to the body of the apparatus. The wireless communication system has a sensor and an antenna. The sensor configured to determine an orientation of the wireless communication system. The antenna is configured to transmit or receive wireless signals. The antenna has a ground plane and a substrate connected to an extending from the ground plane. The substrate has one or more chamfers formed within a wall of the substrate, and feeds disposed on the substrate.

BRIEF DESCRIPTIONS OF THE DRAWINGS

The disclosed embodiments have other advantages and features which will be more readily apparent from the following detailed description of the invention and the appended claims, when taken in conjunction with the accompanying drawings, in which:

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed by way of example embodiments is a wireless communication system that transmits or receives a wireless signal according to an orientation of the wireless communication system. In one aspect, the wireless communication system may include an antenna operable in different configurations. In each configuration, the antenna may have a corresponding antenna gain and polarization in a direction with respect to the antenna. The wireless communication system may further include a sensor for determining an orientation of the wireless communication system. According to the determined orientation, the antenna may be configured to transmit or receive the wireless signal in a corresponding configuration. Hence, the wireless communication system disposed in different orientations can successfully communicate with another wireless communication system.

Example Wireless Communication System

Figure 1:
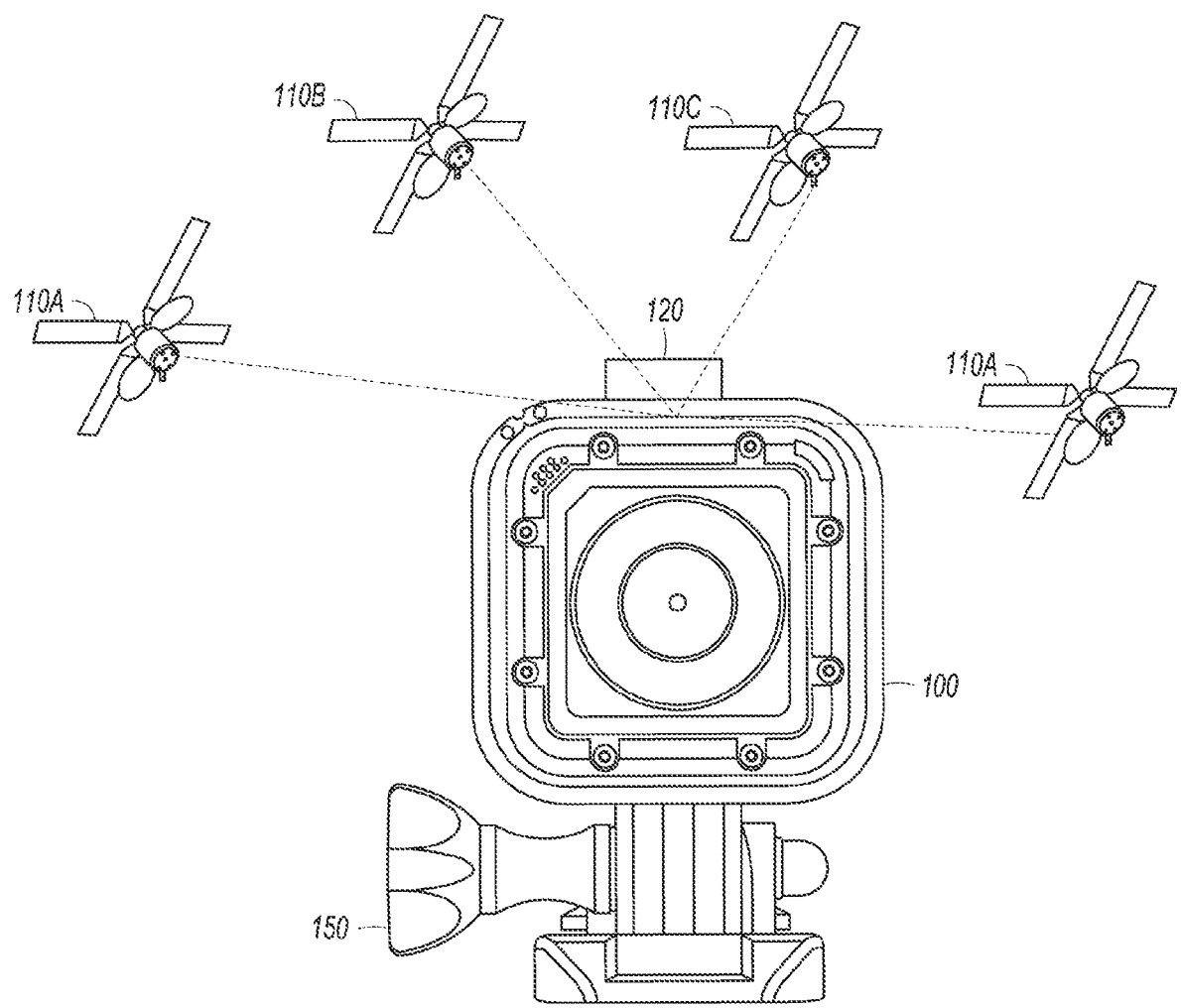
FIG. 1 illustrates an example apparatus including a wireless communication system, according to one embodiment.

FIG. 1 illustrates an example apparatus 100. By way of example, the apparatus 100 may include a camera. The apparatus 100 also may include a wireless communication system 120, according to one example embodiment. The wireless communication system 120 may be integrated within or coupled to a body of the example apparatus 100 and/or camera. The wireless communication system 120 may wirelessly communicate with one or more external communication systems 110A, 110B, 110C, 110D. The external communication systems 110A, 110B, 110C, 110D may be, for example, satellite communication systems, broadcasting stations, mobile communication devices, etc.

The body of the example apparatus 100 may be a mechanical structure or a frame to which electronic devices (e.g., camera) can be coupled. In one aspect, the wireless communication system 120 may communicate with the one or more of the external communication systems 110A, 110B, 110C, 110D according to an orientation of the example apparatus 100.

The example apparatus 100 in FIG. 1 includes a body that may partially or entirely enclose an electronic device (e.g., camera). The body of the example apparatus 100 also may be coupled, through a mount 150, to an object that is in motion or part of an object that is in motion (e.g., helmet, hat, automobile, drone, snowboard, skateboard, extendable pole, etc.). As a result, an orientation of the wireless communication system 120 varies according to a movement or an orientation of the moving object. The wireless communication system 120 arranged in different orientations can successfully communicate with the one or more of the external communication systems 110A, 110B, 110C, 110D (e.g., satellites).

In one example, the electronic device enclosed by the apparatus 100 operates together with the wireless communication system 120. For example, the electronic device is a camera that captures an image, and the wireless communication system 120 is a global positioning system (GPS) receiver that determines a location of the image captured by the camera. Despite the apparatus 100 may be subject to frequent movements in various orientations, the wireless communication system 120 can successfully determine the location of the apparatus 100.

Figure 2:
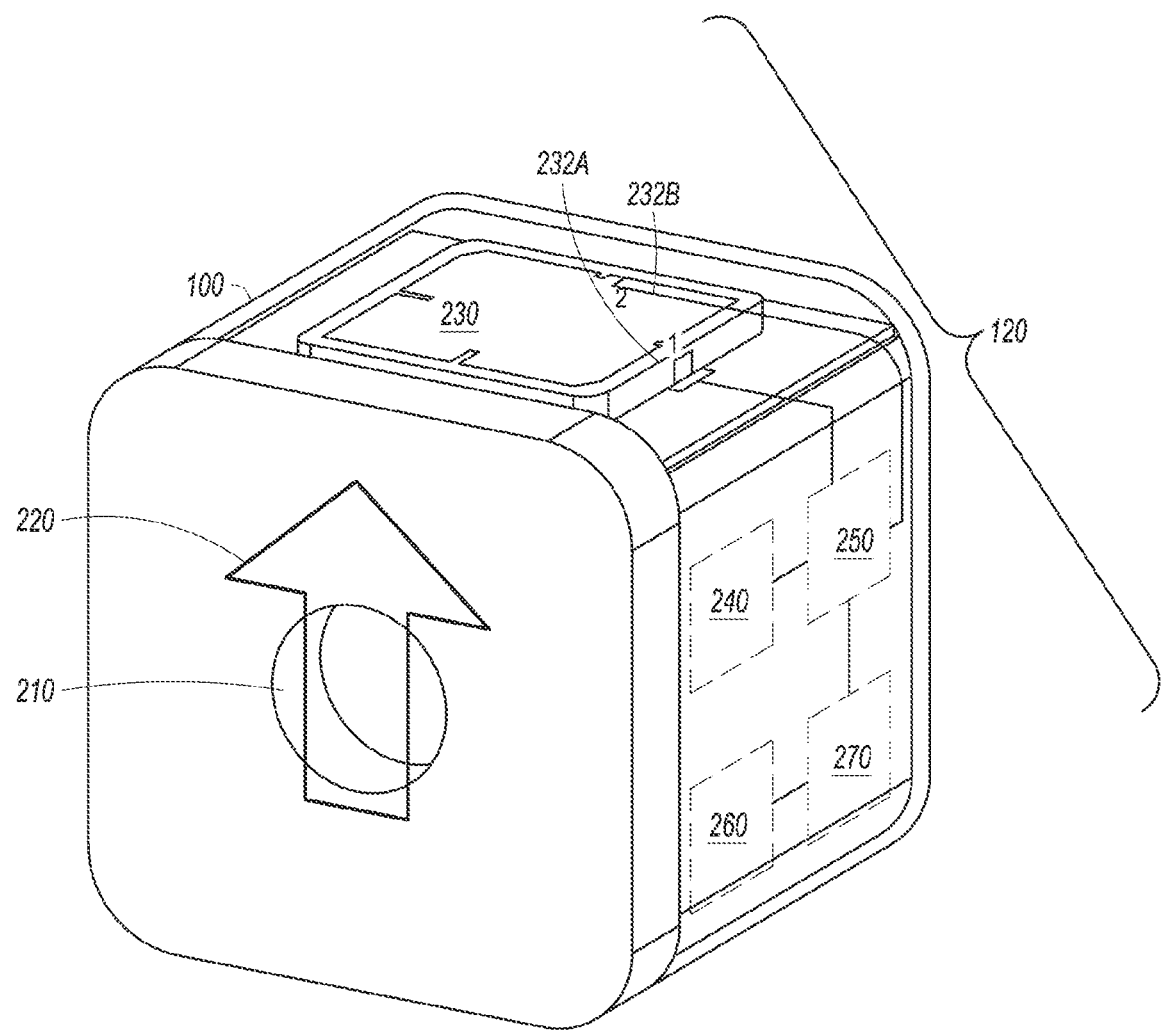
FIG. 2 illustrates example components of the wireless communication system, according to one embodiment.

FIG. 2 illustrates example components of the apparatus 100, according to one embodiment. A body of the apparatus 100 includes a surface to which a lens 210 of a camera is coupled. In the example shown in FIG. 2, a marking 220 is provided on the surface to indicate an orientation of the apparatus 100. The body of the apparatus 100 further includes one or more additional surfaces on which the wireless communication system 120 is coupled. In some embodiments, a different electronic device other than the camera is coupled to the surface. In addition, the marking 220 may be provided on a different portion of the body or may be omitted.

In one embodiment, the wireless communication system 120 includes an antenna 230, a wireless communication circuit 240, a switching unit 250, a sensor 260, and a controller 270. The antenna 230, the wireless communication circuit 240, the switching unit 250, the sensor 260, and the controller 270 are electrically coupled to each other. Together, these components operate together to detect an orientation of the wireless communication system 120, and configure the antenna 230 and/or the switching unit 250 according to the detected orientation for establishing a wireless communication. Some of these components may be disposed on outer surface of the body of the apparatus 100 or disposed on an inner surface of the body. In some embodiments, the wireless communication system 120 includes different, fewer or additional components than shown in FIG. 2.

The sensor 260 is a hardware component that detects an orientation of the apparatus 100. The sensor 260 may be an accelerometer or gyroscope sensor that detects the orientation of the apparatus 100, and generates a detection signal according to the detected orientation. The detection signal is an electric signal indicating the detected orientation. For example, an accelerometer may be used to detect the orientation of the apparatus by determining the gravitational acceleration from measuring acceleration of the 3 principal axes (X, Y and Z). For another example, a gyroscope may be used to detect the orientation of the apparatus by tracking the rotation of the apparatus 100 around the 3 principal axes (X, Y and Z). Yet in another example, measurements from different sensors can be combined to obtain more accurate orientation of the apparatus 100. The sensor 260 generates the detection signal according to the orientation of the apparatus 100 determined through the sensor 260, and provides the detection signal to the controller 270.

The controller 270 is an electric component that receives the detection signal from the sensor 260, and configures the switching unit 250 according to the detection signal. The controller 270 is electrically coupled between the sensor 260 and the switching unit 250. According to an orientation of the apparatus 100 indicated by the detection signal, the controller 270 generates a control signal and provides the control signal to the switching unit 250. The control signal is an electric signal that controls the switching unit 250 for changing a configuration of the antenna 230. The controller 270 may be embodied as a microprocessor implemented on, for example, an application specific integrated circuit (ASIC) or a field-programmable gate array (FPGA).

The switching unit 250 electrically connects the wireless communication circuit 240 to the antenna 230 in a certain configuration, according to the control signal from the controller 270. The switching unit 250 may be electrically coupled between the wireless communication circuit 240 and the antenna 230. Additionally, the switching unit 250 is electrically coupled between the controller 270 and the antenna 230.

The antenna 230 may be a component that allows a wireless signal to be transmitted or received through a wireless medium (e.g., air space). The antenna 230 may include at least two feeds 232A, 232B, through which electric signals can be applied. Depending on the connections of the feeds 232A, 232B, the antenna 230 operates in a certain configuration with a corresponding antenna gain and polarization. In one example for a certain polarization, the antenna 230 operating in a first configuration has a high antenna gain in a first direction with respect to the antenna 230, but has a low antenna gain in a second direction with respect to the antenna 230. In addition, the antenna 230 operating in a second configuration has a low antenna gain in the first direction with respect to the antenna, but has a high antenna gain in the second direction with respect to the antenna 230.

TABLE 1

Example of RHCP Gain at theta = 0 and 180 degree (phi = 0/180 degree) in first configuration (ST1) and a second configuration (ST2).
RHCP Gain

| | Configuration | |
|---|---|---|
| | ST1 | ST2 |
| Upwards (theta = 0 degree with respect to the antenna) | 0 dBi | −12.3 dBi |
| Downwards (theta = 180 degree with respect to the antenna) | −17.4 dBi | −3.1 dBi |

In one example, the antenna 230 is implemented as a patch antenna, and may be right hand circular polarized. Alternatively, the antenna 230 may be implemented as a different type of antenna (e.g., loop antenna, etc.), or polarized differently.

The wireless communication circuit 240 transmits or receives the wireless signal through the antenna 230. The wireless communication circuit 240 is electrically coupled to the antenna 230 through the switching unit 250. The wireless communication circuit 240 includes a transmitting circuit, a receiving circuit, or both. In one example, the wireless communication circuit 240 may include a GPS receiving circuit that receives a wireless signal from satellites through the antenna 230, downconverts the wireless signal, and determines a position of the apparatus 100 based on the downconverted wireless signal.

Figure 3:
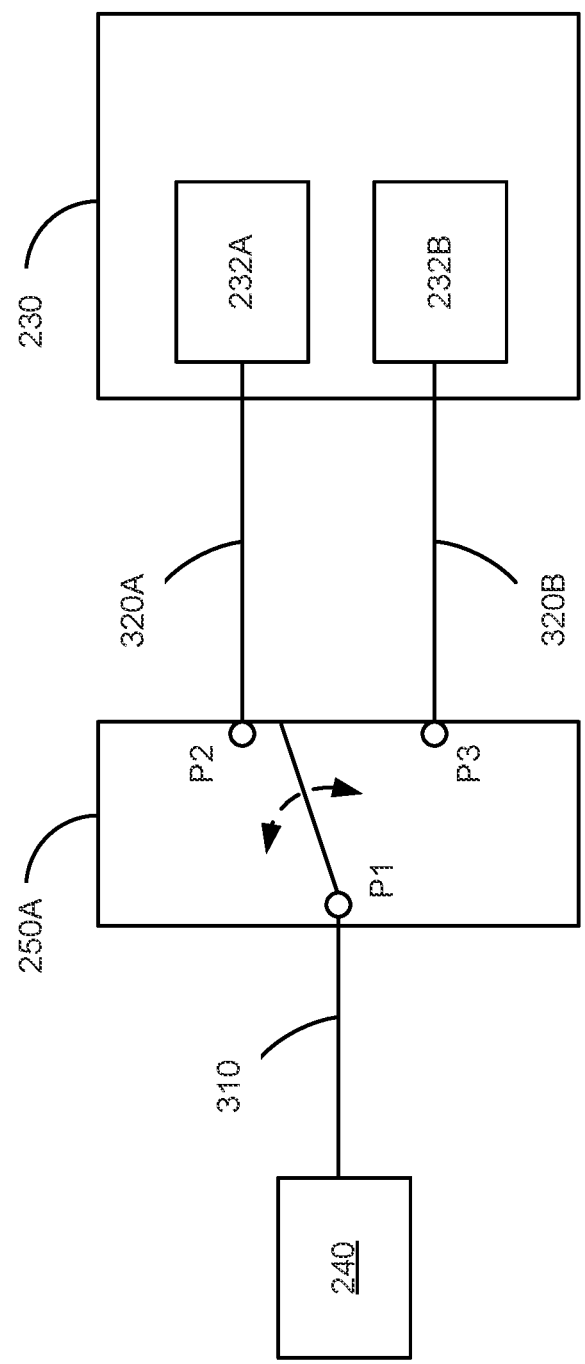
FIG. 3 illustrates an example circuit diagram of the wireless communication system, according to one embodiment.

FIG. 3 illustrates a circuit diagram of the wireless communication system 120, according to one embodiment. The wireless communication system 120 includes the wireless communication circuit 240, the switching unit 250A, and the antenna 230. The sensor 260 and the controller 270 are omitted for simplicity. The switching unit 250A is electrically coupled between the wireless communication circuit 240 and the antenna 230, and couples the wireless communication circuit 240 to either a first feed 232A or a second feed 232B of the antenna 230 according to a detection signal indicating an orientation of the apparatus 100.

In particular, the switching unit 250A includes a first port P1, a second port P2, and a third port P3. The first port P1 is coupled to the wireless communication circuit 240 through a connection 310. The second port P2 is coupled to the first feed 232A of the antenna 230 through a connection 320A. The third port P3 is coupled to the second feed 232B of the antenna 230 through a connection 320B.

When a detection signal indicates that the apparatus 100 is oriented in a first orientation, the switching unit 250A electrically couples the first port P1 to the second port P2, such that the antenna 230 operates in the first configuration. In the first configuration, the first feed 232A of the antenna 230 is electrically coupled to the wireless communication circuit 240, while the second feed 232B of the antenna 230 is decoupled from the wireless communication circuit 240. When the detection signal indicates that the apparatus 100 is oriented in a second orientation, the switching unit 250A electrically couples the first port P1 to the third port P3, such that the antenna 230 operates in the second configuration. In the second configuration, the second feed 232B of the antenna 230 is electrically coupled to the wireless communication circuit 240, while the first feed 232A of the antenna 230 is decoupled from the wireless communication circuit 240. Depending on the connection through the switching unit 250A, the antenna 230 operates in the first configuration or the second configuration.

Figure 4A:
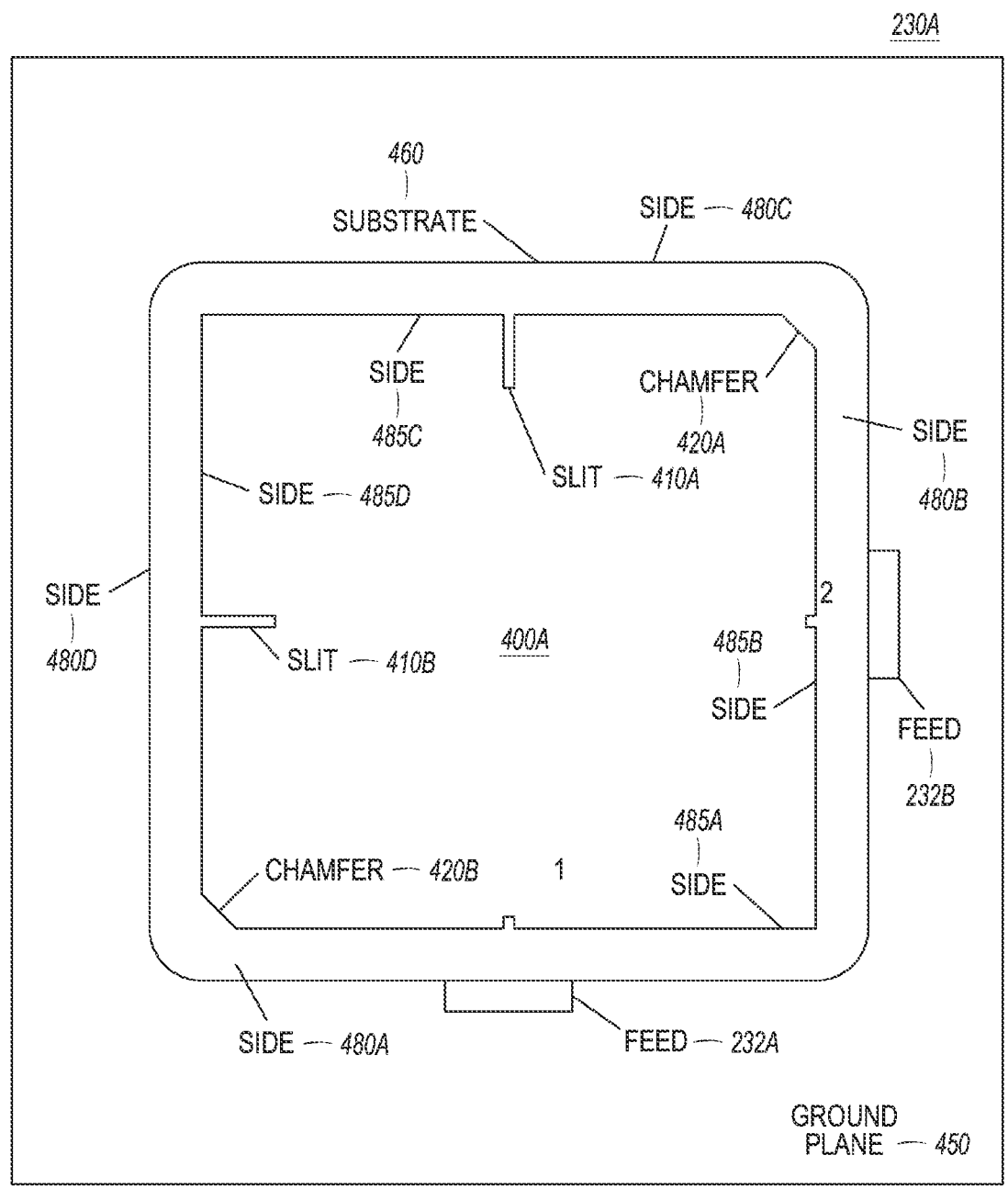
FIG. 4A illustrates a plan view of an example antenna operable in at least two configurations, according to one embodiment.
Figure 4B:
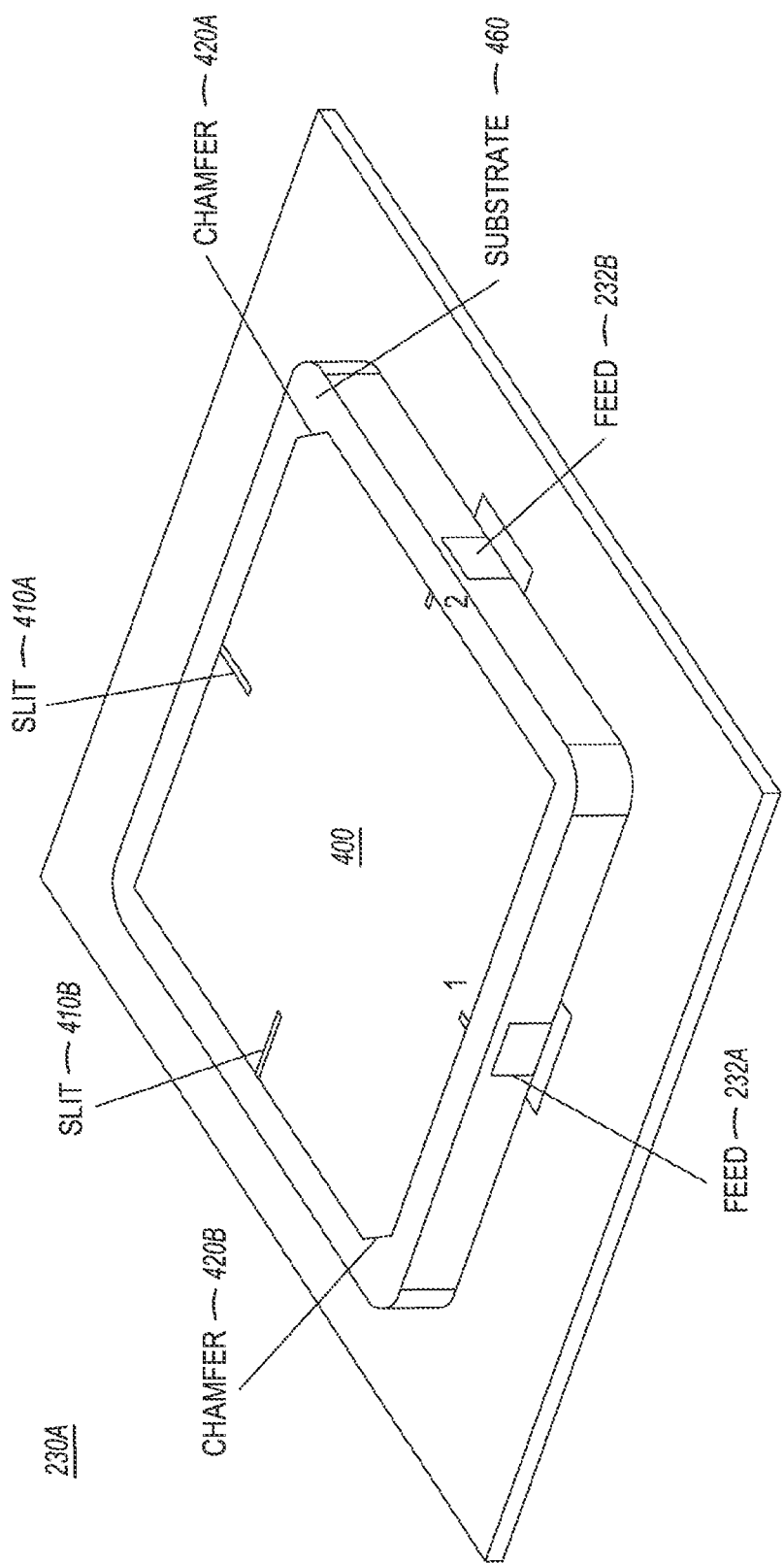
FIG. 4B illustrates a perspective view of the antenna in FIG. 4A, according to one embodiment.

FIG. 4A illustrates a plan view of an example antenna 230A operable in at least two configurations, according to one embodiment. FIG. 4B illustrates a perspective view of the antenna 230A shown in FIG. 4A, according to one embodiment. In one embodiment, the antenna 230A includes a ground plane 450, a substrate 460 (e.g., a wall that extends vertically from the ground plane) on the ground plane 450, a radiator patch 400A within the substrate 460, and two feeds 232A, 232B. The substrate 460 may be a ceramic substrate and may have a generally rectangular shape with side 480A, 480B, 480C, 480D. The feed 232A may be disposed on the side 480A of the substrate 460 (e.g., a first wall), and the feed 232B may be disposed on the side 480B of the substrate 460 (e.g., a second wall) adjoining the side 480A. The radiator patch 400A receives a wireless signal from a wireless medium (e.g., air space), and provides the received wireless signal to the feed 232A, feed 232B or both through proximity coupling. Alternatively, the radiator patch 400A receives a wireless signal from the feed 232A, feed 232B or both through proximity coupling, and radiates the wireless signal to the wireless medium.

In one implementation, the radiator patch 400A comprises a conductive material and generally has a rectangular shape including sides 485A, 485B, 485C, 485D each facing a respective one of the sides 480A, 480B, 480C, 480D of the substrate 460. The radiator patch 400A additionally includes slits 410A, 410B and chamfers 420A, 420B.

Each chamfer 420 may be a cut out portion of a corresponding corner of the radiator patch 400A. In one example, the chamfer 420A is formed on a corner between the side 485C (e.g., a third wall) facing away from the feed 232A and the side 485B (e.g., second wall) facing the feed 232B (e.g., extending between two adjacent walls). In addition, the chamfer 420B is formed on a corner between the side 485D (e.g., a fourth wall) facing away from the feed 232B and the side 485A (e.g., a first wall) facing the feed 232A. Hence, chamfers 420A, 420B are formed on diagonal corners of the radiator patch 400A. The chamfers 420A, 420B generate two orthogonal modes with 90 degree phase difference between them. The placement of each feed 232 relative to the corner chamfers 420 determines the polarization as the phase difference between the orthogonal modes will either lag or lead. By switching a connection of the two feeds 232A, 232B, phase for the orthogonal modes and the polarization of the antenna can be changed.

The slit 410A may be disposed on the side 485C of the radiator patch 400A facing away from the first feed 232A, and the slit 410B may be disposed on the side 485D of the radiator patch 400A facing away from the second feed 232B (e.g., the one or more slits extend inward away from the substrate). In one example, the feed 232A is disposed near a center of the side 480A and the feed 232B is disposed near a center of the side 480B, where the slit 410A is disposed near a center of the side 485C and the slit 410B is disposed near a center of the side 485D. The slits 410A, 410B are added to improve impedance matching and adjust resonance frequency, as shown in FIG. 5.

Figure 5:
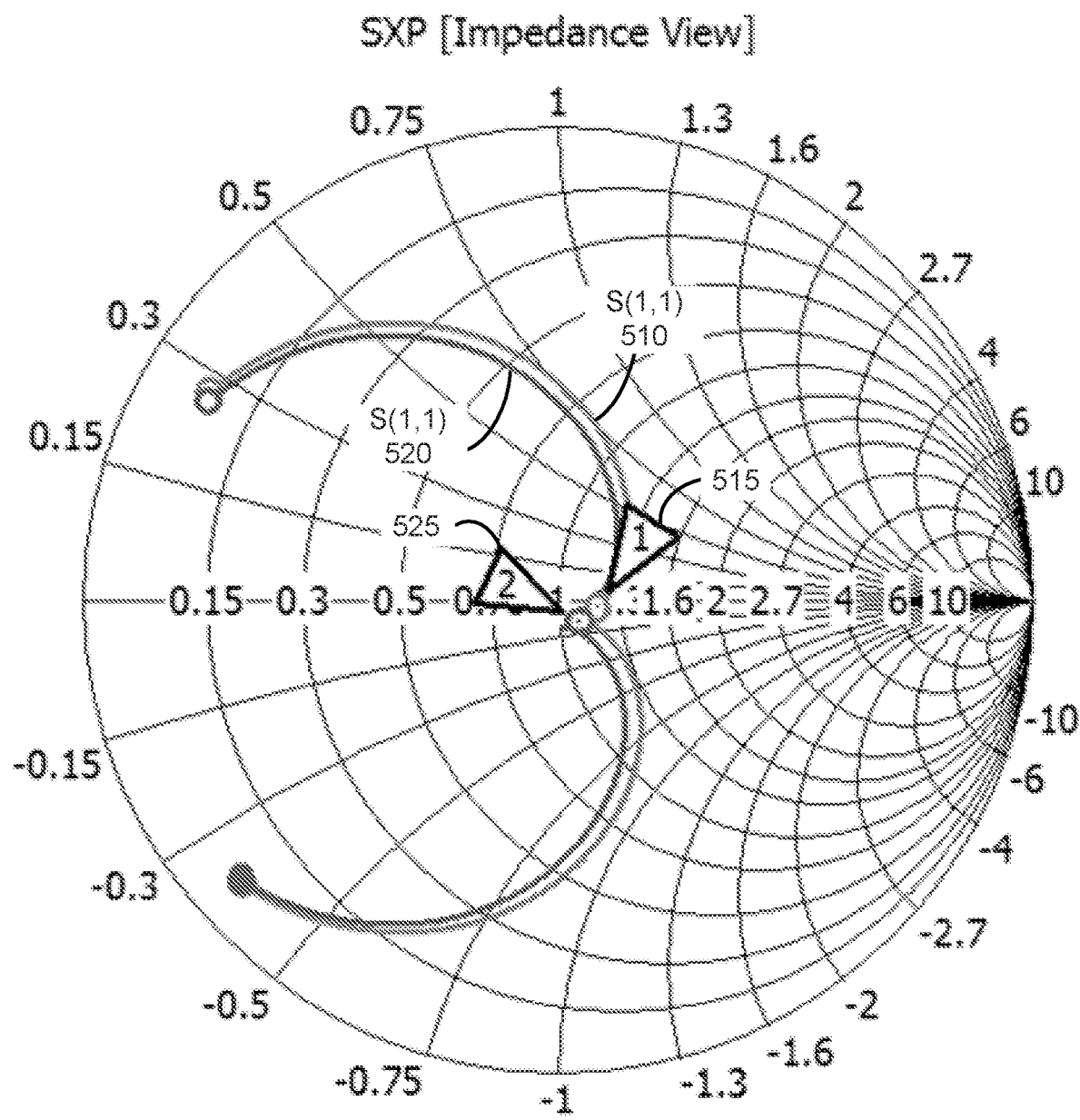
FIG. 5 is a smith chart of an antenna operating in two different configurations, according to one embodiment.

FIG. 5 illustrates a smith chart of the antenna 230A operating in two different configurations, according to one embodiment. The smith chart shown in FIG. 5 shows S(1,1) plot 510 of the first feed 232A and S(1,1) plot 520 of the second feed 232B. As shown in FIG. 5, a point 515 corresponding to a target frequency (e.g., 1.575420 GHz for GPS signal) of the S(1,1) plot 510 of the first feed 232A is close to a center of the smith chart. Similarly, a point 525 corresponding to the target frequency (e.g., 1.575420 GHz for GPS signal) of the S(1,1) plot 520 of the second feed 232B is close to the center of the smith chart. Hence, the impedance at the first feed 232A and the second feed 232B are matched at the target frequency. The slits 410A, 410B allow flexibility of impedance matching or adjusting resonance frequency of the antenna 230A.

Figure 6A:
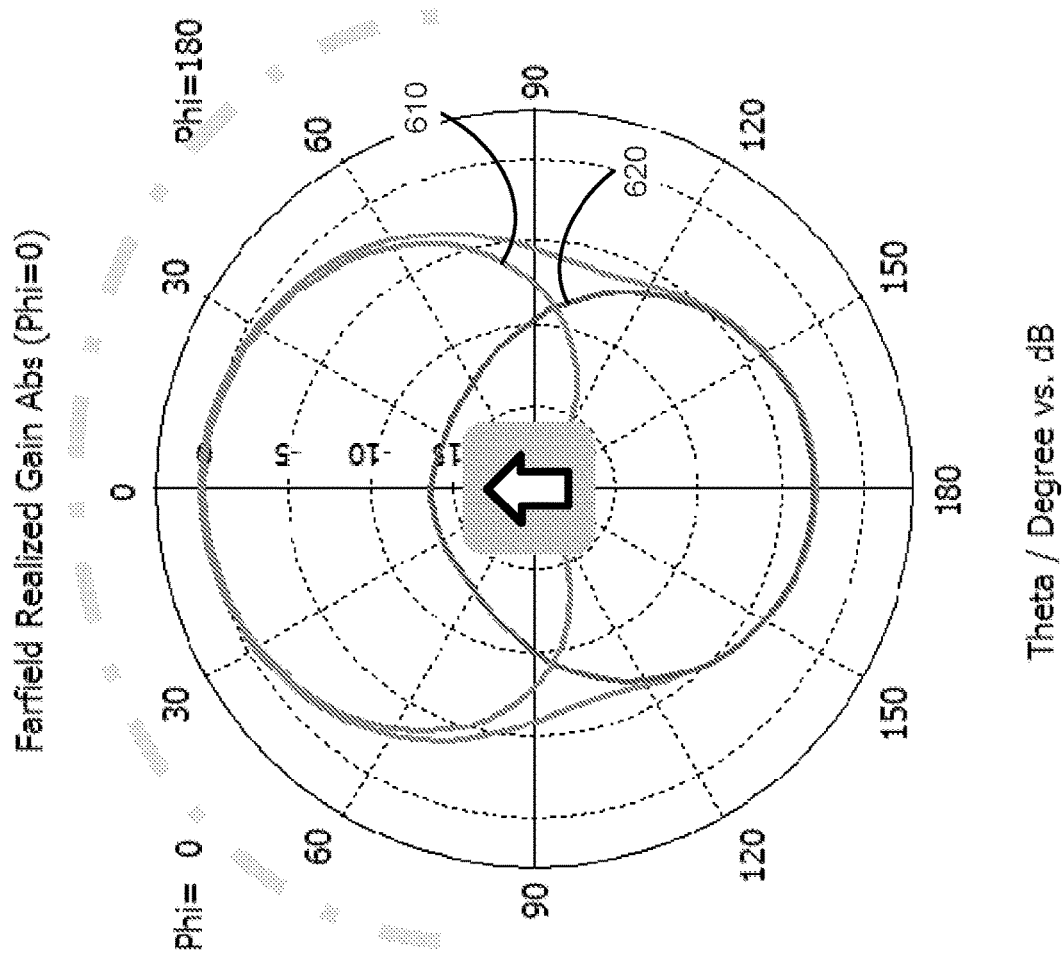
FIG. 6A illustrates a cross section of a radiation pattern of the antenna shown in FIGS. 4A and 4B operating in a first configuration, according to one embodiment.
Figure 6B:
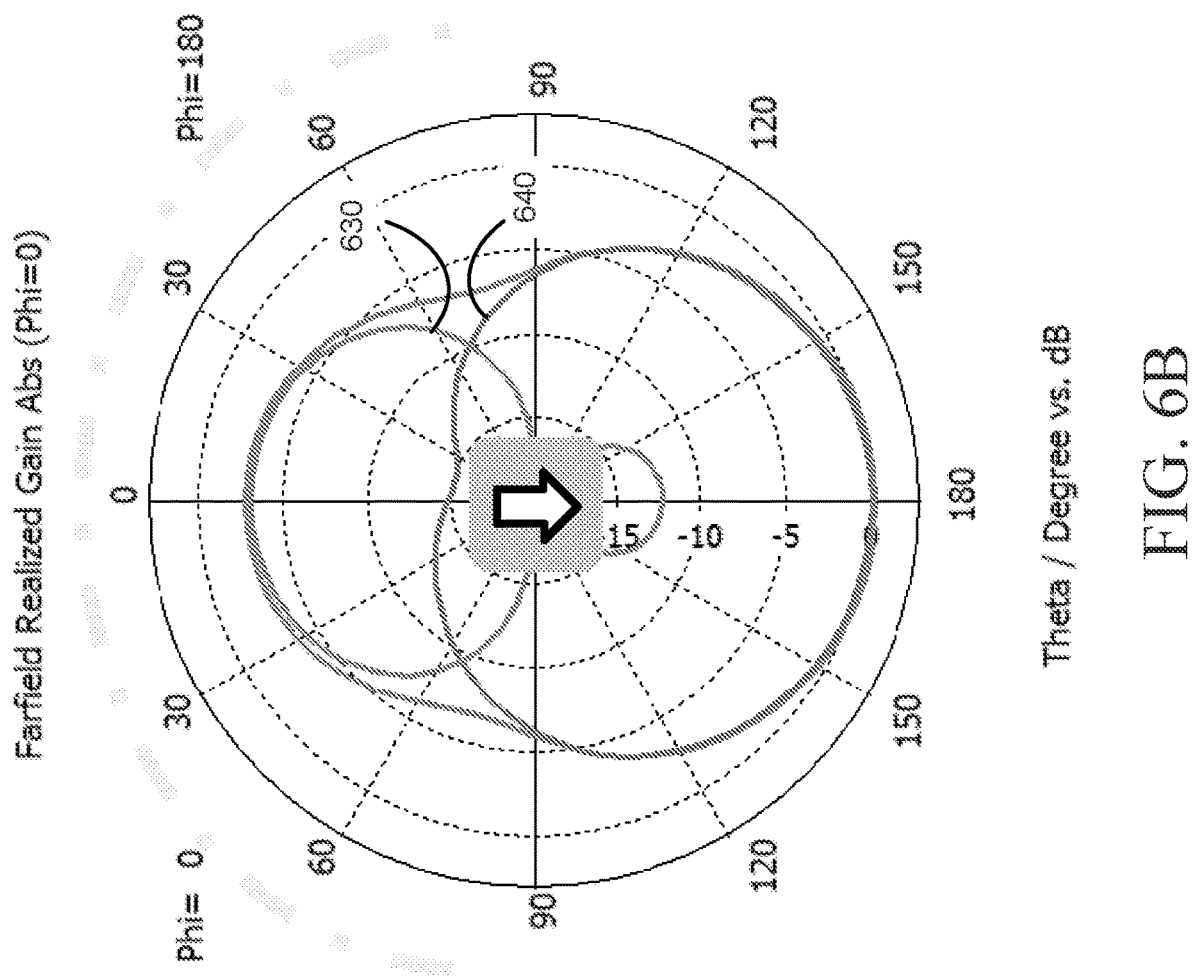
FIG. 6B illustrates a cross section of a radiation pattern of the antenna shown in FIGS. 4A and 4B operating in a second configuration, according to one embodiment.

FIG. 6A illustrates a cross section of the radiation pattern of the example antenna 230A shown in FIGS. 4A, 4B operating in the first configuration. FIG. 6B illustrates a cross section of the radiation pattern of the example antenna 230A shown in FIGS. 4A, 4B operating in a second configuration. The orientation of the antenna 230A in FIG. 6B is '180' degree flipped with respect to the orientation of the antenna 230A in FIG. 6A.

Referring to FIG. 6A, the wireless communication system 120 with the antenna 230A operating in the first configuration can communicate with another wireless communication system 120 within a region 610 in a first polarization (e.g., right hand circular polarization). Thus, in the first polarization, the wireless communication system 120 can communicate with another wireless communication system 120 that is placed further away from the wireless communication system 120 along a '0' degree direction with respect to the wireless communication system 120 than another wireless communication system 120 placed along a '180' degree direction with respect to the wireless communication system 120. In addition, the wireless communication system 120 with the antenna 230A operating in the first configuration can communicate with another wireless communication system 120 within a region 620 in a second polarization (e.g., left hand circular polarization). Thus, in the second polarization, the wireless communication system 120 can communicate with another wireless communication system 120 that is placed further away from the wireless communication system 120 along the '180' degree direction with respect to the wireless communication system 120 than another wireless communication system 120 placed along the '0' degree direction with respect to the wireless communication system 120.

Referring to FIG. 6B, the wireless communication system 120 with the antenna 230A operating in the second configuration can communicate with another wireless communication system 120 within a region 630 in a first polarization (e.g., right hand circular polarization). Thus, in the first polarization, the wireless communication system 120 can communicate with another wireless communication system 120 that is placed further away from the wireless communication system 120 along a '180' degree direction with respect to the wireless communication system 120 than another wireless communication system 120 placed along a '0' degree direction with respect to the wireless communication system 120. (Note the orientation of the wireless communication system 120 in FIG. 6B is '180' degree flipped compared to the one in FIG. 6A.) In addition, the wireless communication system 120 with the antenna 230A operating in the second configuration can communicate with another wireless communication system 120 within a region 640 in a second polarization (e.g., left hand circular polarization). Thus, in the second polarization, the wireless communication system 120 can communicate with another wireless communication system 120 that is placed further away from the wireless communication system 120 along the '0' degree direction with respect to the wireless comtion system 120 placed along the '180' degree direction with respect to the wireless communication system 120.

Figure 6C:
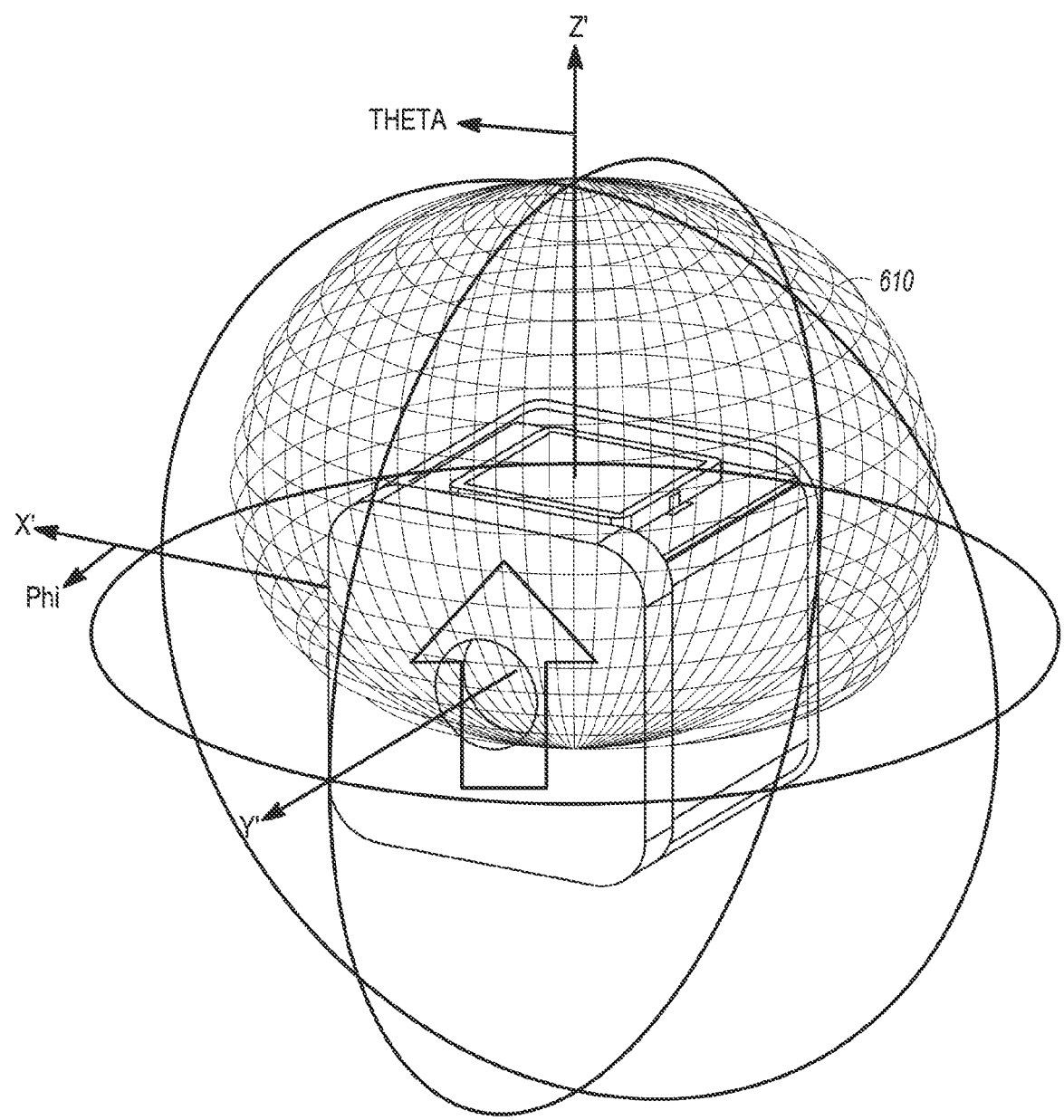
FIG. 6C illustrates a perspective view of a radiation pattern of the antenna operating in a first configuration, according to one embodiment.
Figure 6D:
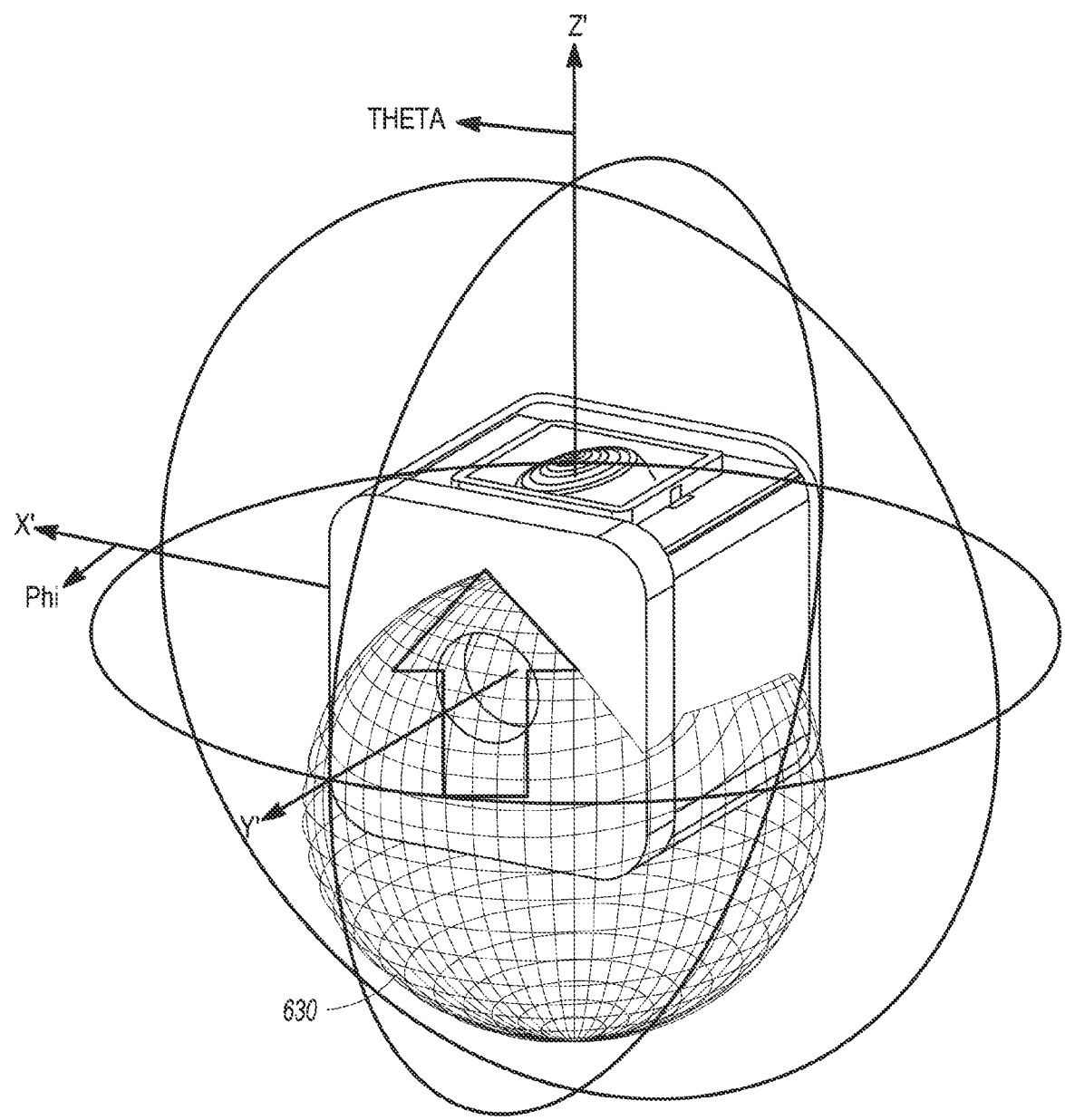
FIG. 6D illustrates a perspective view of a radiation pattern of the antenna operating in a second configuration, according to one embodiment.

FIG. 6C illustrates a perspective view of a radiation pattern of the antenna shown in FIGS. 4A and 4B operating in a first configuration, according to one embodiment. FIG. 6D illustrates a perspective view of a radiation pattern of the antenna shown in FIGS. 4A and 4B operating in a second configuration, according to one embodiment.

Assuming that the wireless communication system 120 communicates with another wireless communication system in the first polarization (e.g., right hand circular polarization), the antenna 230A is configured differently according to an orientation of the wireless communication system 120. For example, the antenna 230A operates in a first configuration according to the switching unit 250A responsive to the wireless communication system 120 is placed in a first orientation as shown in FIG. 6C. Hence, the wireless communication system 120 can communicate with another wireless communication system within the region 610 in the first polarization (e.g., right hand circular polarization). For another example, the antenna 230A operates in a second configuration according to the switching unit 250A responsive to the wireless communication system 120 is placed in a second orientation as shown in FIG. 6D. Hence, the wireless communication system 120 can communicate with another wireless communication system within the region 630 in the first polarization.

Alternatively, the wireless communication system 120 operates with opposite configurations than shown in FIGS. 6C and 6D to communicate with another wireless communication system in the second polarization (e.g., left hand circular polarization). Specifically, the antenna 230A operates in the first configuration according to the switching unit 250A responsive to the wireless communication system 120 is placed in a first orientation. Hence, the wireless communication system 120 can communicate with another wireless communication system within the region 620 of FIG. 6A in the second polarization (e.g., left hand circular polarization). For another example, the antenna 230A operates in the second configuration according to the switching unit 250A responsive to the wireless communication system 120 is placed in a second orientation opposite to the first orientation. Hence, the wireless communication system 120 can communicate with another wireless communication system within the region 640 in the second polarization (e.g., left hand circular polarization).

Figure 7:
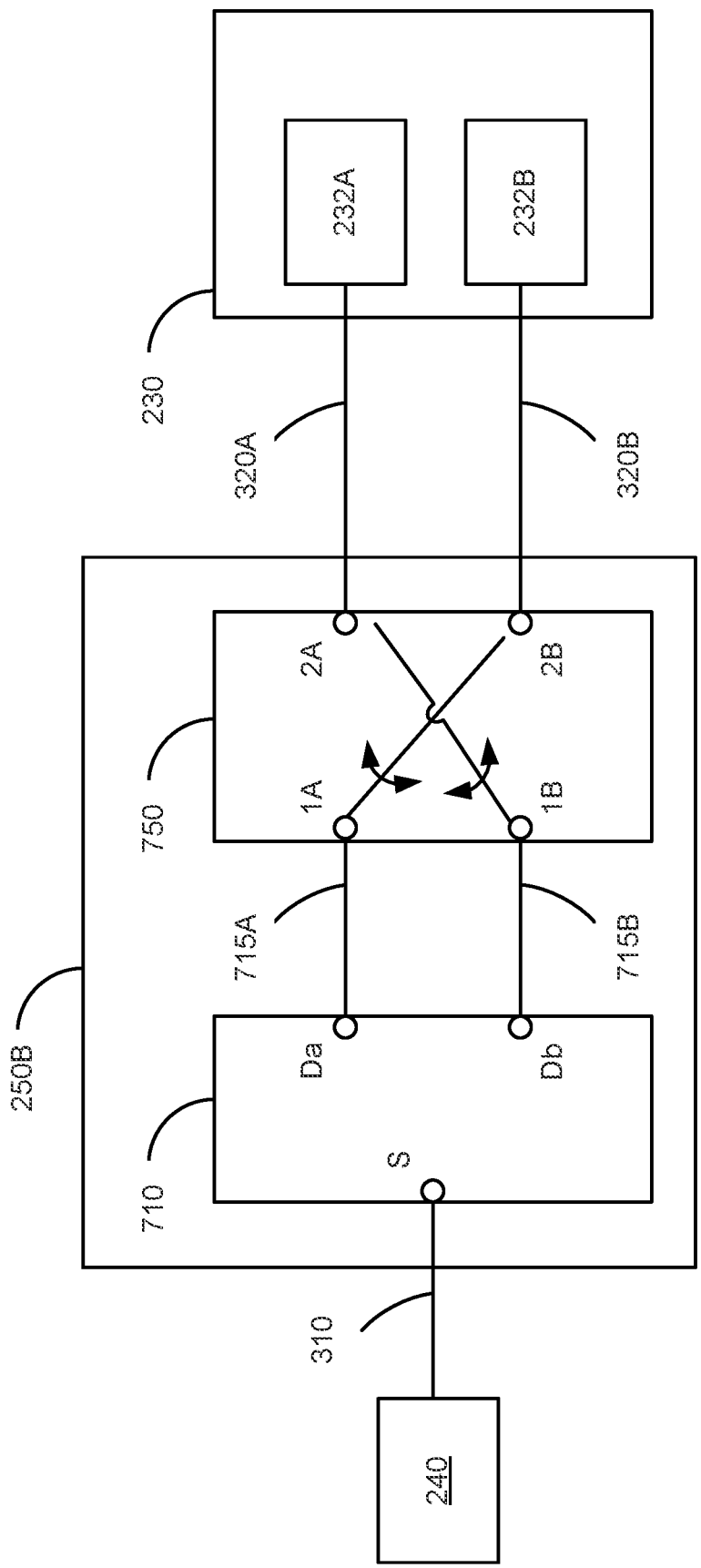
FIG. 7 illustrates an example circuit diagram of the wireless communication system, according to another embodiment.

FIG. 7 illustrates a circuit diagram of the wireless communication system 120, according to another embodiment. The wireless communication system 120 in this embodiment is similar to the one shown in FIG. 7, except the switching unit 250B is electrically coupled between the wireless communication circuit 240 and the antenna 230 instead of the switching unit 250A. In this embodiment, the switching unit 250B is simultaneously coupled to the feeds 232A, 232B of the antenna 230, rather than being coupled to only one of the feeds at a time.

In particular, the switching unit 250B includes a hybrid coupler 710, and a switching circuit 750. The hybrid coupler 710 includes a single ended port S coupled to the wireless communication circuit 240 through the connection 310, and ports Da, Db coupled to the switching circuit 750 through connections 715A, 715B, respectively. The switching circuit 750 includes ports 1A, 1B coupled to the ports Da, Db through connections 715A, 715B, respectively, and ports 2A, 2B coupled to the feeds 232A, 232B through the connections 320A, 320B, respectively. In one aspect, the hybrid coupler 710 converts a single ended signal of the connection 310 into two signals of the connections 715A, 715B with a phase difference (e.g., 90 degree). The switching circuit 750 provides the signals to the antenna 230, according to the detection signal indicating the orientation of the apparatus 100. In another example aspect, the switching circuit 750 receives the signal from the antenna 230, according to the detection signal indicating the orientation of the apparatus 100. Subsequently, the hybrid coupler 710 may combine the signals of the connections 715A, 715B into the single ended signal of the connection 310.

When the detection signal indicates that the apparatus 100 is oriented in a first orientation, the switching unit 250B electrically couples the port 1A to the port 2A, and electrically couples the port 1B to the port 2B, such that the antenna 230 operates in the first configuration. When the detection signal indicates that the apparatus 100 is oriented in a second orientation, the switching unit 250B electrically couples the port 1A to the port 2B, and electrically couples the port 1B to the port 2A, such that the antenna 230 operates in the second configuration. Depending on the connections through the switching circuit 750, the antenna 230 may operate in the first configuration or the second configuration.

Figure 8A:
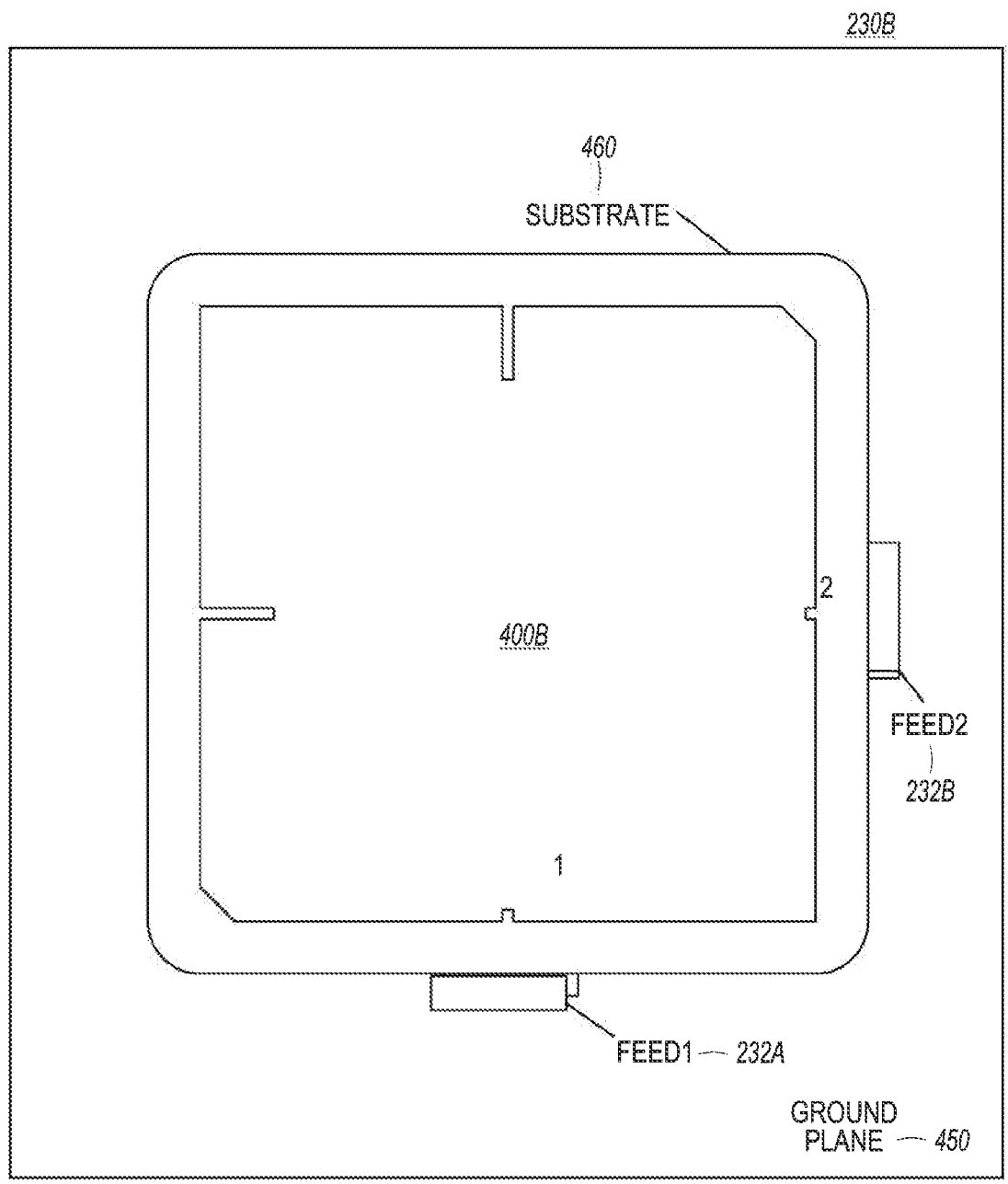
FIG. 8A illustrates a plan view of an example antenna operable in at least two configurations, according to another embodiment.
Figure 8B:
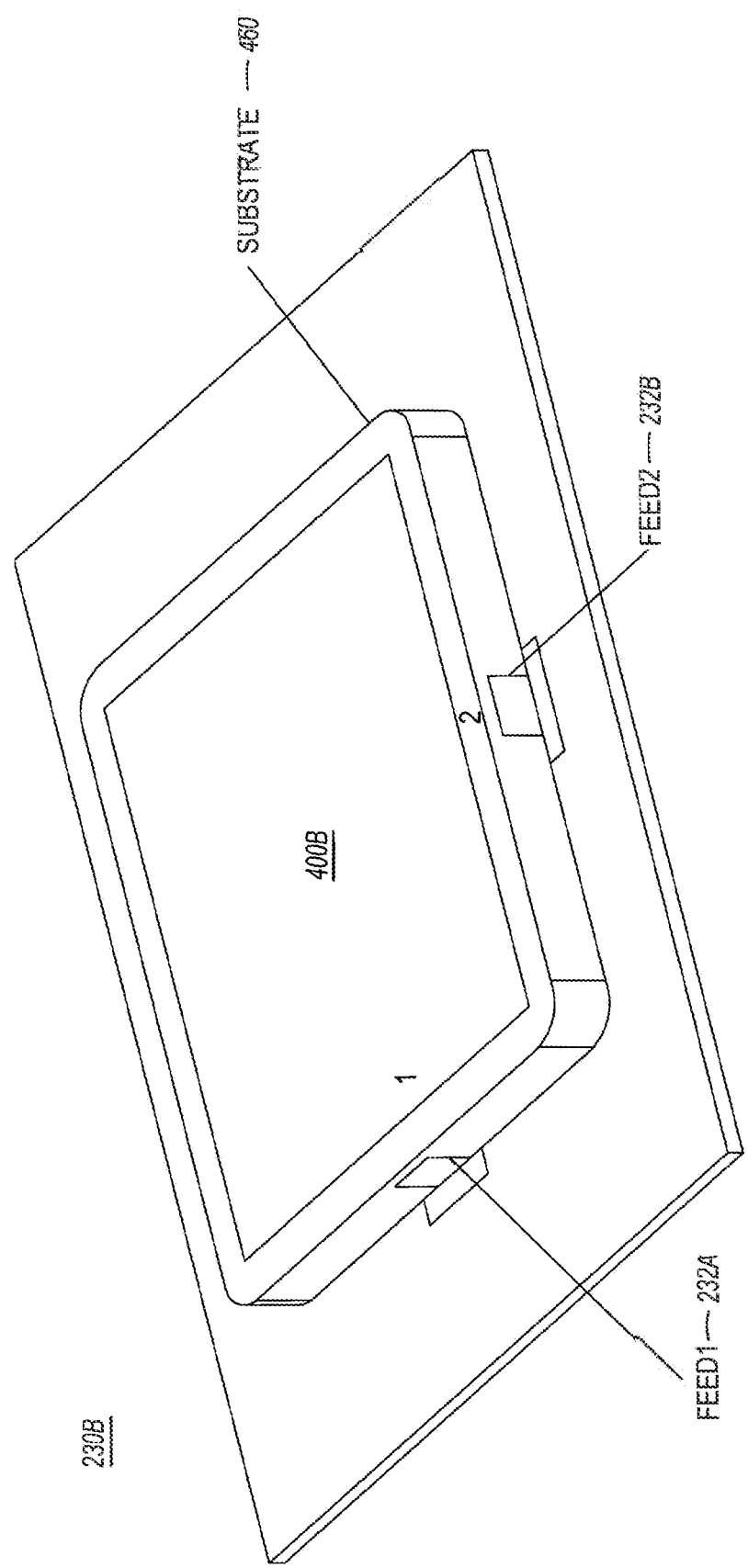
FIG. 8B illustrates a perspective view of the antenna in FIG. 8A, according to one embodiment.

FIG. 8A illustrates a plan view of an example antenna 230B operable in at least two configurations, according to another embodiment. FIG. 8B illustrates a perspective view of the antenna 230B in FIG. 8A, according to one embodiment. The antenna 230B shown in FIGS. 8A and 8B can be implemented in the wireless communication system 120 shown in FIG. 7. The configuration of the antenna 230B is similar to the antenna 230A shown in FIGS. 4A and 4B except the slits 410A, 410B and the chamfers 420A, 420B are omitted. Therefore, the detailed descriptions of the configuration and the operation of the antenna 230B are omitted for the sake of brevity.

In the wireless communication system 120 shown in FIG. 7, a phase difference is achieved through the hybrid coupler 710, whereas in the wireless communication system 120 shown in FIG. 3, a phase difference is achieved through the chamfers 420A, 420B of the antenna 230A. Accordingly, the wireless communication system 120 in FIG. 7 can implement a simpler antenna 230B as shown in FIGS. 8A and 8B than the antenna 230A as shown in FIGS. 4A and 4B.

Figure 9:
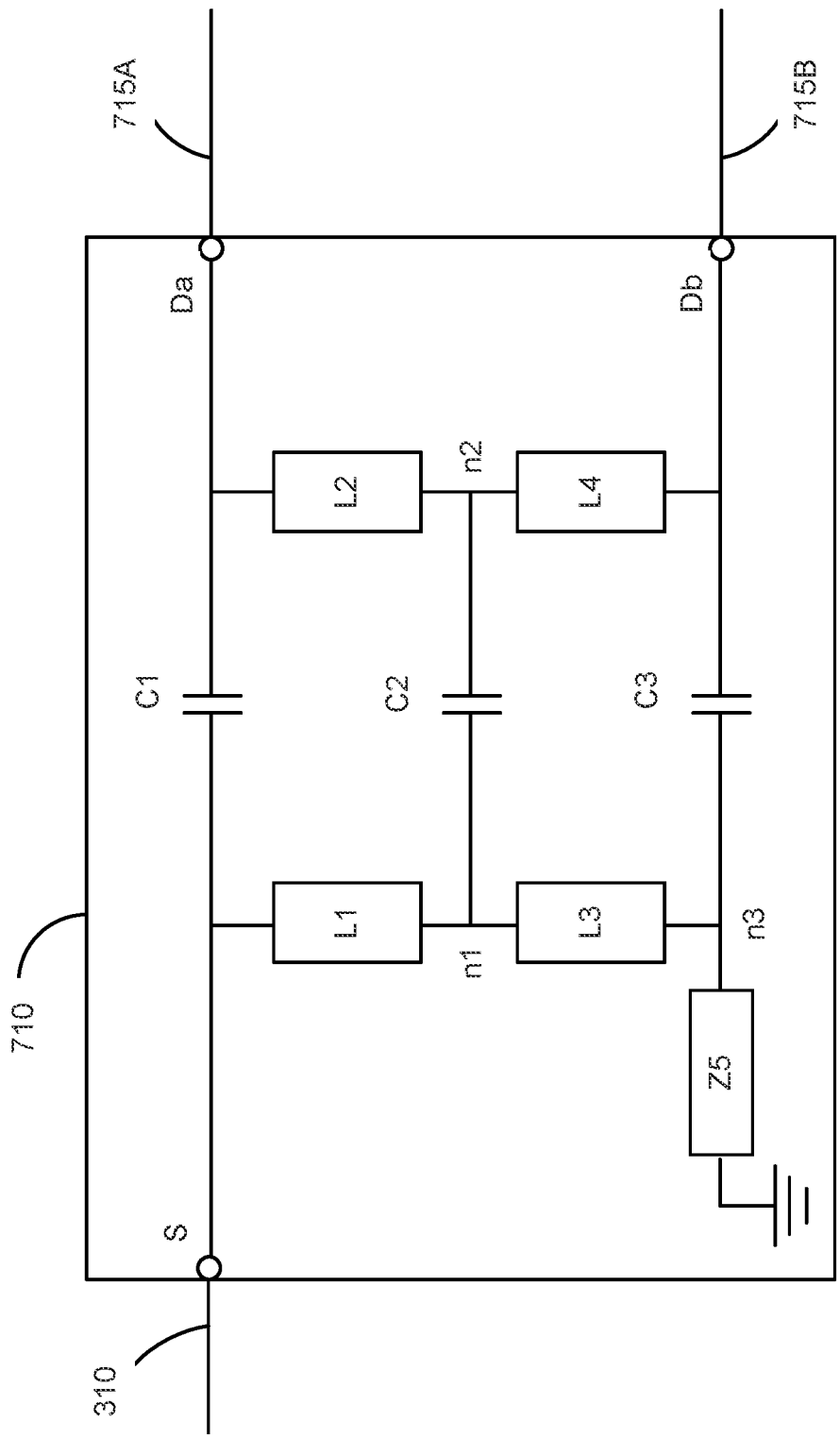
FIG. 9 illustrates a circuit diagram of an example hybrid coupler included in the wireless communication system shown in FIG. 7, according to one embodiment.

FIG. 9 illustrates a circuit diagram of an example hybrid coupler 710, according to one embodiment. In one embodiment, the hybrid coupler 710 includes capacitors C1, C2, C3, inductive elements L1, L2, L3, L4, and a termination circuit Z5. Each of the inductive elements L1, L2, L3, L4 may include an inductor, and the termination circuit Z5 may include a resistor (e.g., 50 ohms) for providing a proper termination. In other embodiments, the hybrid coupler 710 may include different, fewer, or additional components than shown in FIG. 9.

In one implementation, the capacitor C1 is coupled between the single ended port S and the port Da. The capacitor C2 is coupled between a first node n1 and a second node n2. The capacitor C3 is coupled between a third node n3 and the port Db. In addition, the inductive element L1 is coupled between the single ended port S and the first node n1. The inductive element L2 is coupled between the port Da and the second node n2. The inductive element L3 is coupled between the first node n1 and the third node n3. The inductive element L4 is coupled between the second node n2 and the port Db. Moreover, the termination circuit Z5 is coupled between the third node n3 and a reference voltage (e.g., ground). In this arrangement, the single ended signal of the single ended port S is converted into two signals with a phase difference (e.g., 90 degree). Additionally or alternatively, the signals of the ports A and B are converted into the single ended signal of the single ended port S.

Figure 10:
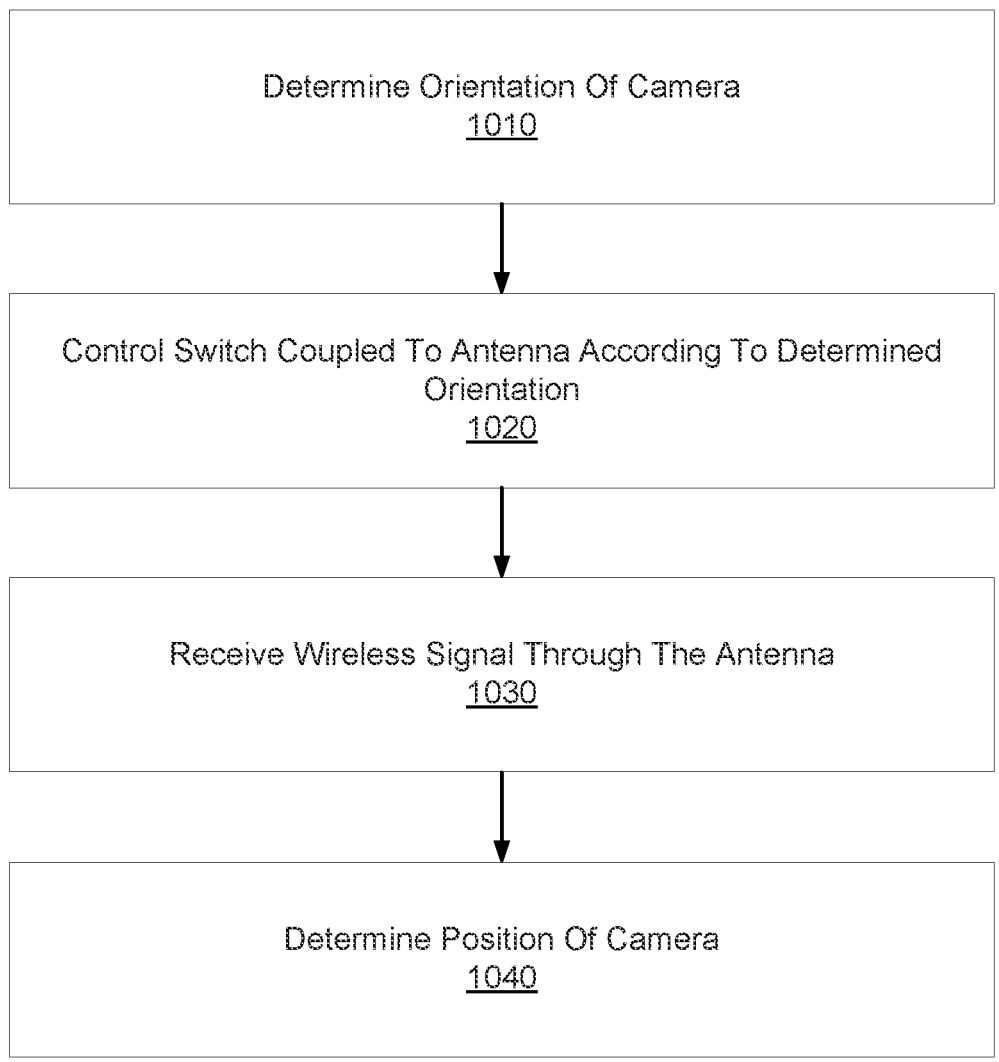
FIG. 10 is a flow chart showing a process of detecting a position of a camera arranged in different orientations, according to the presented embodiments.

FIG. 10 is a flow chart showing a process of detecting a position of a camera arranged in different orientations, according to one example embodiment. The steps in FIG. 10 may be performed by the wireless communication system 120 of the apparatus 100 partially or entirely enclosing the camera. In some embodiments, the wireless communication system 120 may perform different, fewer, or additional steps than shown in FIG. 10.

The wireless communication system 120 determines 1010 an orientation of the camera. For example, a gyroscope or accelerometer determines an orientation of the camera, and generates a detection signal indicating the orientation of the camera.

The wireless communication system 120 controls 1020 a switching unit 250 coupled to the antenna 230 according the detection signal. The switching unit 250 couples a GPS receiver (e.g., wireless communication circuit 240) to the antenna in a configuration according to the orientation of the camera indicated by the detection signal.

The wireless communication system 120 receives 1030 a wireless signal from GPS satellites through the antenna 230. Moreover, the GPS receiver downconverts the wireless signal, and determines 1040 a position of the camera based on the downconverted signal. The GPS receiver may automatically determine a position of the camera, when the camera captures an image.

ADDITIONAL CONFIGURATION CONSIDERATIONS

Advantageously, the wireless communication system disposed in different orientations can successfully communicate with another wireless communication system by configuring an antenna according to different orientations of the wireless communication. In particular, a single antenna may be electrically connected in different arrangements according to the orientation of the wireless communication system, where the antenna operating in each configuration has different antenna polarization gain for a given direction. Hence, the wireless communication system can transmit or receive a wireless signal in different orientations using a single antenna without employing multiple antennas.

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements that are not in direct contact with each other, but yet still co-operate or interact with each other, or are structured to provide a thermal conduction path between the elements. The term "electrically coupled" may encompass two or more electrical components electrically connected to each other through conductive materials. The term "electrically decoupled" may encompass two or more electrical components not electrically connected to each other through conductive materials.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skilled in the art will appreciate still additional alternative structural and functional designs as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An apparatus comprising:
a body partially enclosing a camera; and
a wireless communication system integrated within or coupled to the body of the apparatus, the wireless communication system comprising:
a sensor configured to determine an orientation of the wireless communication system; and
an antenna configured to transmit or receive wireless signals, wherein the antenna comprises:
a ground plane; and
a substrate connected to and extending from the ground plane, the substrate comprising:
one or more chamfers formed within a wall of the substrate; and
feeds disposed on the substrate.

2. The apparatus of claim 1, further comprising:
a radiator patch located within the substrate.

3. The apparatus of claim 2, wherein the radiator patch includes one or more slits that extend inward away from the substrate.

4. The apparatus of claim 1, where the one or more chamfers include two chamfers and a first chamfer is diagonally opposite a second chamfer.

5. The apparatus of claim 1, wherein the substrate extends vertically from the ground plane.

6. The apparatus of claim 1, wherein the antenna is connected to a first wall of the body and a wireless communication circuit, switching unit, the sensor, controller, or a combination thereof are connected to a second wall of the body.

7. The apparatus of claim 6, wherein the antenna is in electrical communication with the wireless communication circuit, the switching unit, the sensor, the controller, or a combination thereof.

8. The apparatus of claim 1, further comprising:
a receiver circuit coupled to the body; and
a switch electrically coupled between the receiver circuit and the antenna, the switch configured to electrically configure a connection between the receiver circuit and a first feed and a second feed of the antenna.

9. An apparatus comprising:
a body partially enclosing a camera; and
a wireless communication system integrated within or coupled to the body of the apparatus, the wireless communication system comprising:
 a sensor configured to determine an orientation of the wireless communication system; and
 an antenna configured to transmit or receive wireless signals, wherein the antenna comprises:
  a ground plane; and
  a substrate connected to and extending away from the ground plane, the substrate comprising:
   one or more chamfers extending between two adjacent walls of the substrate; and
   feeds disposed on the substrate, wherein the feeds provide electric signals to the antenna.

10. The apparatus of claim 9, wherein the feeds comprise:
a first feed on a first wall of the substrate and
a second feed on a second wall of the substrate.

11. The apparatus of claim 10, wherein the first wall is connected to the second wall.

12. The apparatus of claim 10, wherein one or more chamfers extends between the first wall and a fourth wall of the substrate.

13. The apparatus of claim 12, wherein a second of the one or more chamfers extends between the second wall and a third wall of the substrate.

14. The apparatus of claim 9, further comprising:
a radiator patch located within the substrate.

15. The apparatus of claim 14, wherein the radiator patch includes one or more slits that extend inward away from the substrate.

16. The apparatus of claim 9, where the one or more chamfers include two chamfers and a first chamfer is diagonally opposite a second chamfer.

17. An apparatus comprising:
a body partially enclosing a camera; and
a wireless communication system integrated within or coupled to the body of the apparatus, the wireless communication system comprising:
 a sensor configured to determine an orientation of the wireless communication system; and
 an antenna configured to transmit or receive wireless signals, wherein the antenna comprises:
  a ground plane; and
  a substrate connected to and extending away from the ground plane, the substrate comprising:
   a first wall,
   a second wall connected to the first wall,
   a third wall connected to the second wall,
   a fourth wall connected to the first wall and the third wall,
   one or more chamfers extending between the first wall and the fourth wall of the substrate, the second wall and the third wall, or both; and
   feeds disposed on first wall and the second wall of the substrate, wherein the feeds provide electric signals to the antenna.

18. The apparatus of claim 17, further comprising:
a radiator patch located within the substrate.

19. The apparatus of claim 18, wherein the radiator patch includes one or more slits that extend inward away from the substrate.

20. The apparatus of claim 17, further comprising:
a receiver circuit coupled to the body; and
a switch electrically coupled between the receiver circuit and the antenna, the switch configured to electrically configure a connection between the receiver circuit and a first feed and a second feed of the antenna.

* * * * *